United States Patent [19]
Rector et al.

[11] Patent Number: 5,774,328
[45] Date of Patent: Jun. 30, 1998

[54] REGISTER ENCLOSURE FOR USE WITH A UTILITY METER

[75] Inventors: William O. Rector; Patrick J. Horan, both of Dover; David Dopp, Somersworth, all of N.H.

[73] Assignee: General Electric Company, New York, N.Y.

[21] Appl. No.: 632,569

[22] Filed: Apr. 15, 1996

[51] Int. Cl.[6] .................................................. H02B 9/00
[52] U.S. Cl. ........................... 361/667; 73/431; 324/156; 361/752
[58] Field of Search ................................ 174/52.1, 52.3, 174/59, 66; 361/736, 740, 741, 752, 756, 759, 659, 664–667, 672; 235/441, 492; 73/431, 273, 861.78; 340/870.02, 870.31; 324/156, 157, 74, 96, 103 R

[56] References Cited

U.S. PATENT DOCUMENTS

| | | | |
|---|---|---|---|
| 3,668,476 | 6/1972 | Wrabel | 317/101 DH |
| 3,737,729 | 6/1973 | Carney | 317/101 PH |
| 4,388,672 | 6/1983 | Skill | 361/412 |
| 4,673,872 | 6/1987 | Germer | 361/364 |
| 4,959,607 | 9/1990 | Coryea et al. | 324/103 R |
| 5,027,056 | 6/1991 | Rusillo, Jr. | 324/103 R |
| 5,066,906 | 11/1991 | Moore | 324/142 |
| 5,087,875 | 2/1992 | Balch | 324/157 |
| 5,398,157 | 3/1995 | Paul | 361/684 |

*Primary Examiner*—Gerald P. Tolin
*Attorney, Agent, or Firm*—Carl B. Horton; Hanh T. Pham

[57] ABSTRACT

An electronic energy meter register enclosure which, in one embodiment, includes ribs and snaps configured to engage and snugly hold a printed circuit board in place is described. Openings in a meter frame align with openings in the enclosure, and threaded bolts securely engage the enclosure to the meter frame. The enclosure also includes, in the one embodiment, a snap which snaps on the rear bearing of the meter for facilitating holding the register enclosure in place. The enclosure further includes a shroud, and sidewalls of the shroud are configured to be closely positioned proximate the sides of the meter frame to reduce amount of ambient light allowed in the cavity of the shroud. The combination of the meter disc, the meter mechanical register, the meter frame and the shroud almost completely shields the electrical components of the register circuit board from harmful UV exposure that would create degradation and excessive heat build-up. The shroud further reduces the thermal temperature rise of the electrical components on the printed circuit board because the shroud functions as a solar shield.

19 Claims, 3 Drawing Sheets

REGISTER ENCLOSURE FOR USE WITH A UTILITY METER

FIELD OF THE INVENTION

This invention relates generally to electricity metering and more particularly, to an electronic register enclosure for use in connection with an electricity meter.

BACKGROUND OF THE INVENTION

An electromechanical watthour meter including an electronic register typically utilizes an eddy current disk which rotates in response to the rate of energy consumption by a load being metered. A shutter is commonly mounted on the same shaft as the eddy current disk, and the shutter is positioned to rotate between a light emitter and a light detector pair mounted to a register circuit board. A plurality of circumferential teeth on the rotating shutter sequentially break the light beam between the light emitter and light detector pair to generate a series of electrical pulses, the frequency of which is directly proportional to the rate of energy consumption by the load being metered. The pulses are supplied to other components of the electronic register and, using the pulse data, the electronic register generates well known energy consumption measurements.

Known electronic registers for electromechanical type electricity meters typically include a circuit board positioned within an enclosure configured to be mounted to the meter. A microprocessor and memory components typically are included on the circuit board. A known enclosure is configured to securely engage the circuit board and is described in U.S. Pat. No. 5,072,056, which is assigned to the present assignee.

More recently, electronic registers have been configured to include communication components so that metering data stored in the register memory can be transmitted to a remote service center. Although such communicating registers include communication components not included in earlier registers, and in order to reduce the register cost, it is desirable to reduce the size and number of register components, to simplify assembly, and to include additional capability and functions in the register.

SUMMARY OF THE INVENTION

These and other objects may be attained in an electronic energy meter register enclosure which, in one aspect, includes a shroud and snaps for forming a snap fit with the register circuit board. More specifically, the enclosure includes ribs and snaps configured to engage and snugly hold the printed circuit board in place. Openings in meter frame align with openings in the enclosure, and threaded bolts securely engage the enclosure to the meter frame. The enclosure also includes a snap which snaps on the rear bearing of the meter for facilitating holding the register enclosure in place.

Also, sidewalls of the shroud are configured to be closely positioned proximate the sides of the meter frame to reduce amount of ambient light allowed in the cavity of the shroud. The combination of the meter disc, the meter mechanical register, the meter frame and the shroud almost completely shields the electrical components of the register circuit board from harmful ultraviolet (UV) exposure that would create degradation and excessive heat build-up. The shroud therefore serves as a UV "umbrella" to reduce and slow the degradation of register components due to UV exposure. The shroud further reduces the thermal temperature rise of the electrical components on the printed circuit board because the shroud functions as a solar shield. The enclosure, in one embodiment, also includes a shadowbox which aligns with a light emitting diode (LED) of the printed circuit board to improve the viewability of an LED, secured to the printed circuit board, under bright, ambient conditions.

The above described register enclosure provides the advantage that a printed circuit board can be easily and securely assembled into the enclosure thereby simplifying and reducing the time required to assemble an electronic meter register. In addition, the embodiment of the enclosure described above is configured for a meter register that does not include a display, e.g., a liquid crystal display. Specifically, the enclosure, in the embodiment described above, is configured for use in a communicating register. Therefore, costs associated with such a display are eliminated, and such cost savings can be used to at least offset some of the cost associated with the communication components of the register.

DETAILED DESCRIPTION OF THE DRAWINGS

Figure 1:
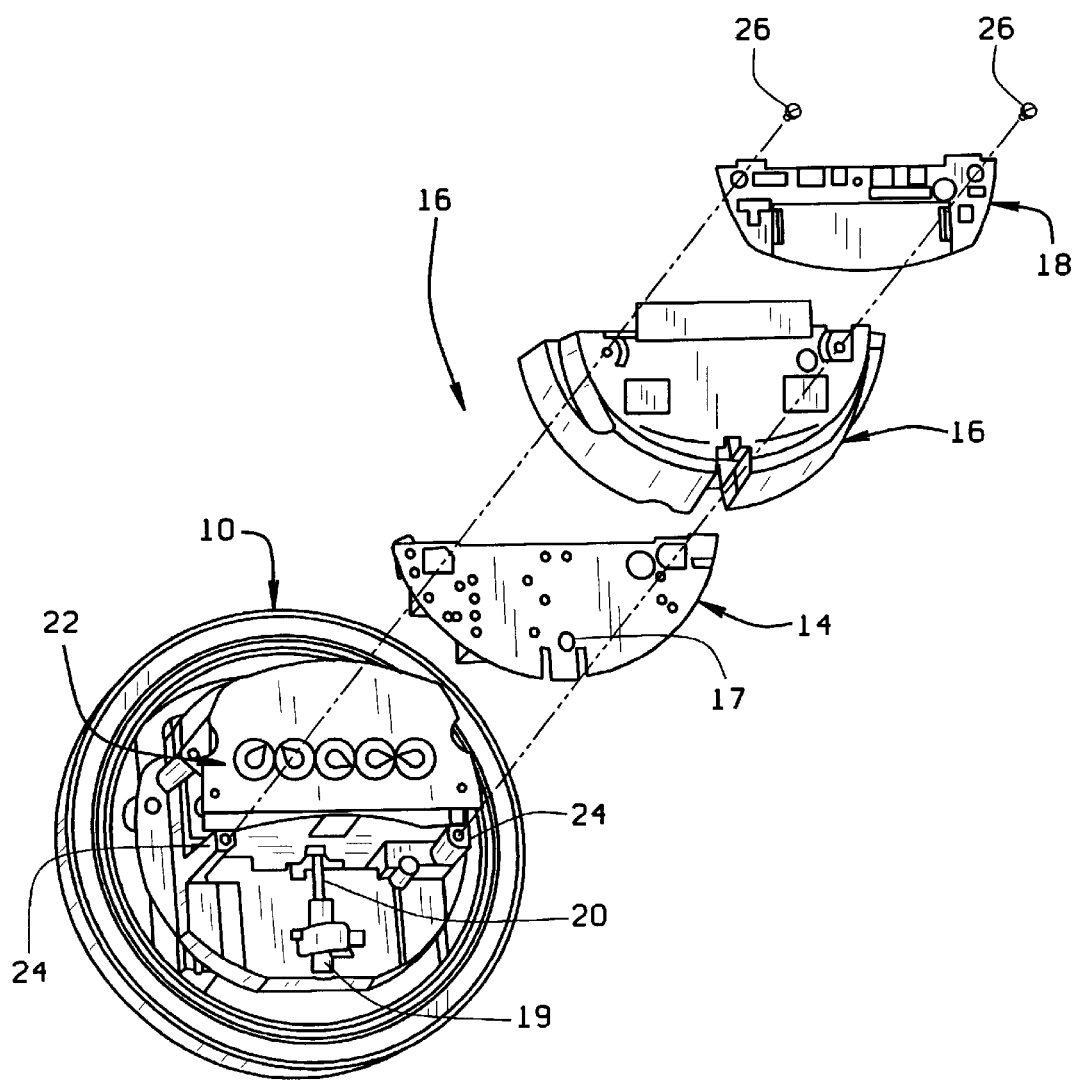
FIG. 1 is a perspective, exploded view of an electromechanical meter, a register printed circuit board, a register enclosure, and a register nameplate.

FIG. 1 is a perspective, exploded view of an electromechanical meter 10, an electronic register 16 including a register printed circuit board 14 having electrical components 9 and a register enclosure 12, and a register nameplate 18. Electromechanical meter 10 includes a rotating shaft 20 and an eddy current disc (not shown) coupled to shaft 20. Rotating shaft 20 also is coupled to gears (not shown) which drive dials 22. The rotation rate of shaft 20 and the disc is proportional to the quantity of energy being consumed by a load. Meter 10 may, for example, be a GE I-70 type meter available from GE Meter, 130 Main Street, Somersworth, N.H., 03878.

Electronic register printed circuit board 14, when assembled, is positioned at least partially within enclosure 12, and register 16 is mounted to mounts 24 of meter 10. Meter nameplate 18 is secured to register enclosure 12 by screws 26 which extend through aligned openings in register 16, nameplate 18, and mounts 20. Nameplate 18 typically includes meter and register identification and operation information. A light emitter and light detector pair (not shown) secured to printed circuit board 14 are positioned so that a shutter (not shown) mounted on shaft 20 rotates between the emitter and detector pair. A plurality of circumferential teeth on the rotating shutter sequentially break the light beam between the light emitter and light detector pair, and a series of electrical pulses are output by the light detector. The frequency of the pulses is directly proportional to the rate of energy consumption by the load being metered. The pulses are supplied to other components on printed circuit board 14 and, using the pulse data, well-known energy consumption measurements are derived.

Meter 10, printed circuit board 14 and nameplate 18 are illustrated herein by way of example only. The present invention is not directed to meter 10, printed circuit board 14, nor nameplate 18. Rather, the present invention is directed to register enclosure 12, and variations thereof. Register enclosure 12 can be used in many other meters, with other printed circuit boards and nameplates, other than meter 10, printed circuit board 14, and nameplate 18.

Figure 2:
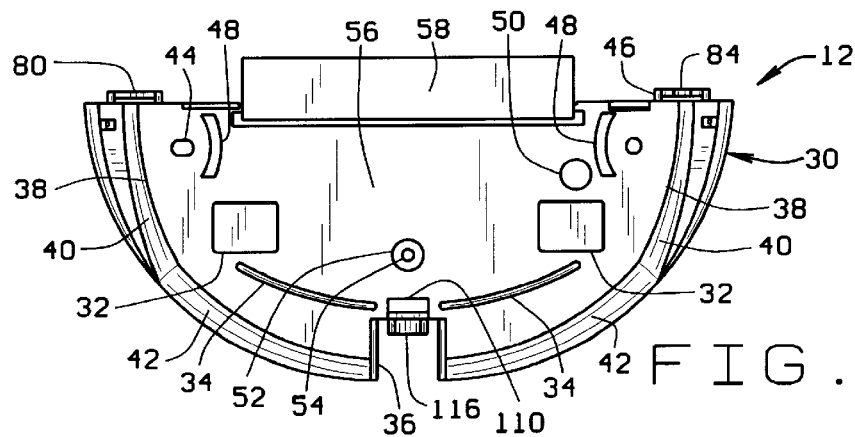
FIG. 2 is a front view of the register enclosure shown in FIG. 1.

FIG. 2 is a front view of register enclosure 12. Enclosure 12 may be molded, for example, from GE plastic #503, 10% glass filled mechanical grade polycarbonate with 73083 grey as its color for extra UV protection, commercially available from GE Plastics, One Plastics Avenue, Pittsfield, Mass. 01201. To reduce material costs, enclosure 12 may have thin walls, e.g., 0.065 inches thick.

Enclosure 12 includes a shroud 30 for at least partially blocking direct sunlight from the register circuit board components. As used herein, the term "shroud" refers to those portions of a register enclosure (e.g., enclosure 12) which block direct sunlight from the register circuit board. Recess pockets 32, which are inset approximately 0.070 inches, are provided for clearance of meter bar code and identification tags. Accent grooves 34 are provided to enhance styling lines of meter nameplate 18 (FIG. 1). A cavity 36 also is provided to enable viewing of a light emitting diode of the register printed circuit board and for access to printed circuit board finger connectors. The finger connectors may be etched and tinned contacts integral with the printed circuit board.

A top edge 38 of shroud 30 has a curvature which matches the curvature of the meter nameplate. A drafted sidewall 40 of shroud 30 transitions down to close to the printed circuit board mounting plane.

A slot 44 is provided for mounting register 16 to a meter. Slot 44 is wide in the x direction but tight in the y direction in order to accurately locate register 16 on the meter. An opening 46 also is provided for mounting and accurately position register 16 on the meter. Cut-outs 48 through shroud 30 facilitate molding of the printed circuit board mounting snap features described hereinafter in more detail. Opening 50 is provided for access to the full load adjustment screw on the meter. A pocket 52 including a center tab 54 is used in the molding process and is located on the center of gravity of enclosure 12. Injecting the plastic at about the center of gravity of enclosure 12 facilitates molding enclosure 12 in a balanced fashion and furthermore restricts, or reduces, the amount of cold material that accumulates between shots of the molding machine and is injected into a cold slug.

A mounting plane 56 is provided to be in substantial surface-to-surface contact with the meter nameplate for support. Also, a raised platform 58 is provided for mounting serial number labels. Platform 58 is configured to be located as close as possible to the meter cover and is at a slight angle to improve readability of the serial number through the meter cover.

Figure 3:
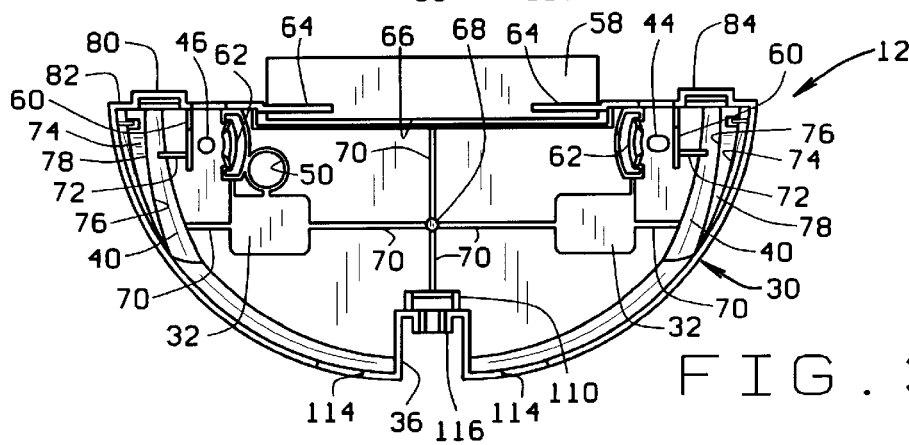
FIG. 3 is a rear view of the register enclosure shown in FIG. 1.

Referring to FIG. 3 which is a rear view of register enclosure 12, locating/positioning ribs 60 are provided for the printed circuit board. Ribs 60 are radiused on the top edges to facilitate ease of assembly of the printed circuit board into enclosure 12. Ribs 60 locate the printed circuit board in all three axis planes, and the accuracy of ribs 60 is important to properly locate the printed circuit board, including an optics assembly forming part of the printed circuit board, with respect to the meter disk shutter assembly. Additionally, slot 44 and opening 46 provide additional alignment to minimize mislocation of the printed circuit board optics assembly due to the tight tolerances and dimensional control thereof.

Printed circuit board mounting snaps 62 are provided for locating the printed circuit board in the z axis. Snaps 62 include a spring feature to accommodate tolerances without interfering with the ease of assembly of the printed circuit board into enclosure 12. Specifically, snaps 62 are tapered to facilitate inserting the printed circuit board thereover. When the printed circuit board is snapped onto snaps 62, guided by locating/positioning ribs 60 and subsequently assembled to the meter, the taper guide edges of snaps 62, which are described hereinafter in more detail, lock the printed circuit board in place. The cooperation between mounts 24 of meter 10 and snaps 62 substantially prevents the inadvertent release of snaps 62.

Gussets 64 provide support and stiffen platform 58. An air gap 66 is provided to allow molding the bottom edge of platform 58 without requiring side action in the mold during the molding process.

Tab 68, sometimes referred to in the art as a cold slug, provides location of the center of gravity of enclosure 12 in the x and y axis during molding (tab 68 is on the opposite side of surface 56 from tab 54 (FIG. 2)). Tab 68 can be used as an ultrasonic weld projector for fastening of shields in enclosure 12 should such fastening ever be required. Cross flow ribs 70 are provided to improve ease of moldability of enclosure 12 and to impart additional stiffness and rigidity while keeping the nominal wall thickness of enclosure 12 to a minimum. Cross-wise gussets 72 are provided to strengthen and facilitate molding of ribs 60. Protrusions 74 are provided to help locate the printed circuit board within enclosure 12. Protrusions 74 also facilitate tightly holding the printed circuit board in place and eliminating motion of the circuit board in the z-axis. An inside edge 76 of shelf 78 is created to locate protrusions 74.

Figure 4:
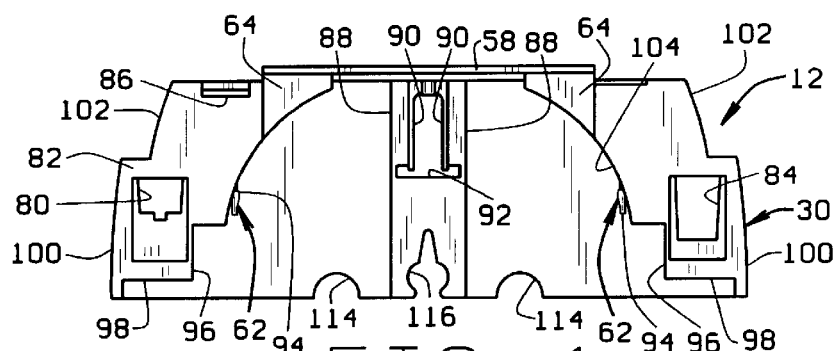
FIG. 4 is a top view of the register enclosure shown in FIG. 1.

Referring to FIG. 4 which is a top view of enclosure 12, a cutout 80 is provided on a vertical face 82 of shroud 30 to allow assembly and disassembly of a an option board connector. Cutout 80 is sized and located such that it both polarizes and keys the location of the option board connector to prevent, or minimize, misassembly of the mating connector and cable assembly. Another cutout 84 is provided to allow assembly and disassembly of the printed circuit board power/communication plug. A slot 86 is located through face 82 of shroud 30 to allow acceptance of a slip-on ground clip. The ground clip establishes electrical contact between the meter nameplate, meter frame and ground traces of the printed circuit board.

Surfaces 88 are provided to position the printed circuit board in the x-direction. Ribs 90 and slot 92 cooperate with surfaces 88 to locate and support the printed circuit board. More specifically, the printed circuit board, in one configuration, includes a tongue and groove configuration so that the circuit board tongue extends into slot 92, and the groove edges of the circuit board are in snug contact with surfaces 88. Radial surface of ribs 90 are in contact with a substantially planar surface of the printed circuit board and facilitate snugly holding the circuit board in place.

Also, tapered guide edges 94 of snaps 62 facilitate holding the printed circuit board in place. Specifically, edges 94 snap through openings in the printed circuit board and prevent inadvertently pulling the board out from enclosure 12 as described hereinafter in more detail.

Sidewalls 96 of shroud 30 are configured to be closely positioned proximate the sides of the meter frame to reduce amount of ambient light allowed in the cavity of shroud 30. More specifically, one important functional property of shroud 30 is to provide a UV "umbrella" to reduce and slow the degradation of register components due to UV exposure. Additionally, shroud 30 reduces the thermal temperature rise experienced by the electrical components on the printed circuit board because shroud 30 functions as a solar shield. The combination of the meter disc, the meter mechanical register, the meter frame and shroud 30 almost completely shields the electrical components of the register circuit board from harmful UV exposure that would create degradation and excessive heat build-up. Surface 98 provides a clearance, or a passageway, between shroud 30 and the meter frame for routing of optional electrical wires and cables that may be required. The side curvature of surface 100 of shroud 30 is configured to closely match the curvature of the meter glass cover and provide both a more acceptable aesthetic appearance and tight packing of the register enclosure 12 under the meter cover. Surface 102 is provided for the same purpose as surface 100. Also, the curvature of shroud edge surface 104 closely matches the curvature of the meter disc to maximize the amount of solar shielding provided by shroud 30.

Figures 5, 6:
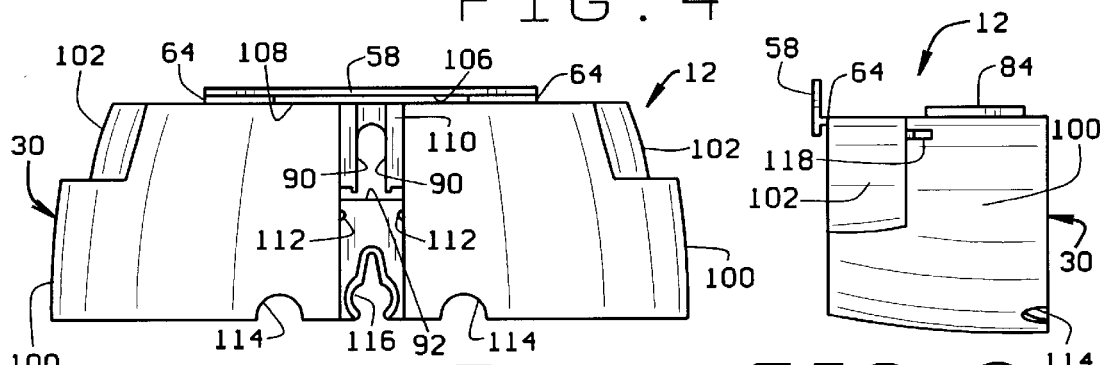
FIG. 5 is a bottom view of the register enclosure shown in FIG. 1.
FIG. 6 is a side view of the register enclosure shown in FIG. 1.

Referring to FIG. 5 which is a bottom view of enclosure 12, a gap 106 between serial number label platform 58 and edge 108 allows for positioning of meter nameplate 18 prior to assembling the meter nameplate screws. Also, a shadow-box 110 is provided to align with a light emitting diode (LED) 17 of the printed circuit board to improve the viewability of the LED under bright, ambient conditions. Guides 112 facilitate positioning a test connector which may be used during manufacture to test the printed circuit board. Cutouts 114 allow passage of a light beam used in the calibration of the meter in final assembly. A snap 116 is provided which snaps on the rear bearing 19 of the meter (see FIG. 1) for holding register enclosure 12 in place for transporting and accurate location of enclosure 12 prior to assembly of the meter nameplate screws 26 which, in assembly, provide the final securing of enclosure 12 in place.

FIG. 6 is a side view of enclosure 12. As shown in FIG. 6, surface 102 tapers into surface 100 at a lower portion of shroud 30. Also, slots 118 (only one slot is visible in FIG. 6) are formed as a result of the molding process.

Figure 7:
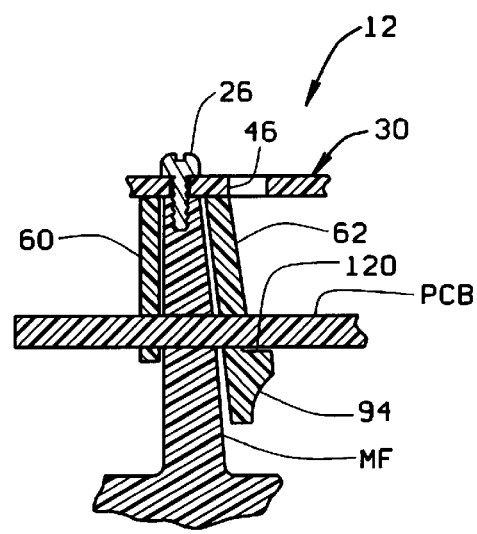
FIGS. 7 and 8 are cross-sectional views of the printed circuit board and enclosure 12.

FIG. 7 is a cross section view illustrating a portion of a printed circuit board PCB and a meter frame MF secured to enclosure 12. As shown in FIG. 7, meter frame protrudes through printed circuit board PCB and between rib 60 and snap 62 and an opening in meter frame MF aligns with opening 46 in enclosure 12, and threaded bolt 26 securely engages enclosure 12 to meter frame MF via the aligned openings. Printed circuit board PCB also includes openings through which rib 60 and snap tapered portion 94 extend, and an edge surface 120 of portion 94 contact printed circuit board PCB and holds it in place.

Figure 8:
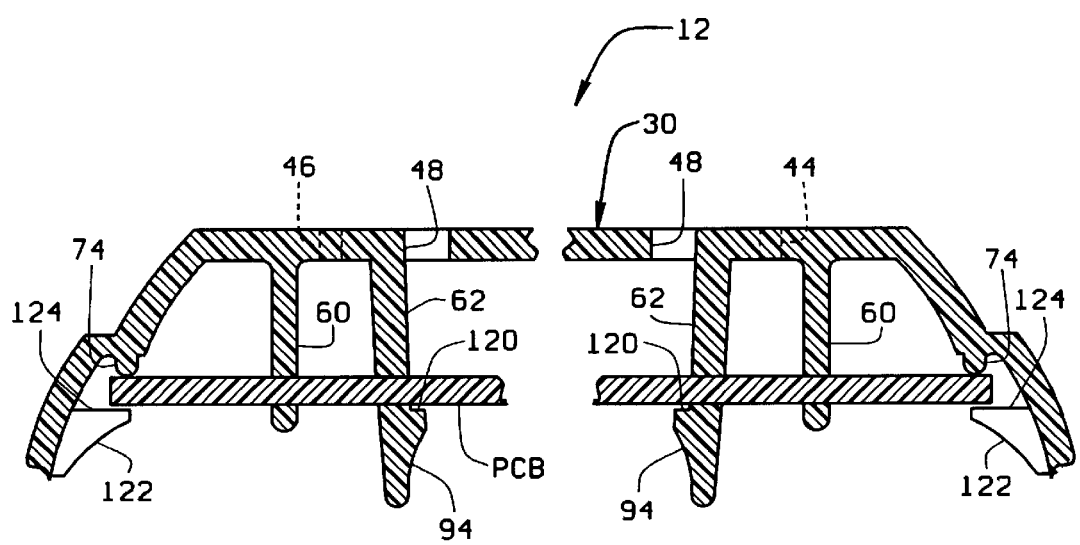

More specifically, and with respect to the snap fit of printed circuit board PCB within enclosure 12, FIG. 8 illustrates a portion of printed circuit board PCB and enclosure 12. As shown in FIG. 8, edge portions of printed circuit board PCB are in contact with protrusions 74 and positioning members 124 having edge surfaces 122. Also, and as described above, printed circuit board PCB also includes openings through which ribs 60 and snap tapered portions 94 extend, and edge surfaces 120 of portions 94 contact printed circuit board PCB. In this manner, printed circuit board PCB is held in snug engagement with enclosure 12.

The above described register enclosure provides the advantage that a printed circuit board can be easily and securely snapped into engagement with the enclosure, thereby simplifying and reducing the time required to assemble an electronic meter register. In addition, enclosure 12 is specifically configured for a meter register that does not include a display, e.g., a liquid crystal display. Enclosure 12 is configured for use in a communicating register. Therefore, costs associated with such a display are eliminated, and such cost savings can be used to at least offset some of the cost associated with the communication components of the register.

From the preceding description of various embodiments of the present invention, it is evident that the objects of the invention are attained. Although the invention has been described and illustrated in detail, it is to be clearly understood that the same is intended by way of illustration and example only and is not to be taken by way of limitation. Accordingly, the spirit and scope of the invention are to be limited only by the terms of the appended claims.

What is claimed is:

1. An electric energy meter comprising:
   a register enclosure;
   an eddy current disk within said enclosure rotating in response to energy consumed by a metered load;
   a meter frame within said enclosure mounting said eddy current disk;
   a register circuit board carrying electrical components;
   a shroud at least partially blocking the register circuit board from direct sunlight;
   at least one circuit board mounting snap securely engaging the register circuit board in position;
   retaining means on said shroud engaging the register circuit board; and
   wherein said snap and said retaining means securely engage and position the register circuit board in the register enclosure.

2. The electric meter of claim 1 wherein said register enclosure further comprises a plurality of positioning ribs and positioning snaps engaging the register circuit board.

3. The electric meter of claim 1 wherein said register enclosure further comprises a clamping snap snapping on a rear bearing of the electricity meter.

4. A register enclosure assembly in accordance with claim 1 wherein said shroud further comprises sidewalls configured to be closely positioned proximate sides of the meter frame.

5. A register enclosure assembly in accordance with claim 1 wherein said shroud substantially shield the electrical components of the register circuit board from ultraviolet exposure.

6. A register enclosure assembly in accordance with claim 1 wherein said electrical components of the register circuit board include a light emitting diode, and said register enclosure further comprises a shadow box which aligns with said light emitting diode.

7. A register enclosure assembly in accordance with claim 1 wherein said resister enclosure is molded from a polycarbonate.

8. The electric meter of claim 1 wherein said register enclosure further comprises a raised platform mounting a serial number label thereto.

9. The electric meter of claim 8 wherein said register enclosure further comprises gussets which support and stiffen said platform.

10. A register enclosure assembly in accordance with claim 1 wherein said register enclosure further comprises a cutout on a face of said shroud to allow assembly and disassembly of an option board connector to the register circuit board, said cutout sized and located so that said cutout both polarizes and keys the location of the option board connector.

11. A register enclosure assembly in accordance with claim 1 wherein said register enclosure further comprises a cutout on a face of said shroud to allow assembly and disassembly of a register circuit board power/communication plug.

12. A register enclosure assembly in accordance with claim 1 wherein the register circuit board further includes a tongue and groove configuration and wherein said retaining means comprises ribs and a slot for cooperating with the tongue and groove configuration of the register circuit board.

13. An energy meter assembly in accordance with claim 1 wherein said register enclosure further comprises:
- a first cutout on a face of said shroud to allow assembly and disassembly of an option board connector to the register circuit board, said first cutout sized and located so that said first cutout both polarizes and keys the location of said option board connector; and
- a second cutout on a face of said shroud to allow assembly and disassembly of a register circuit board power/communication plug.

14. An electric meter register enclosure assembly comprising:
- an electric meter;
- a meter frame;
- a register enclosure mounted to said meter frame;
- a register circuit board partially enclosed in said register enclosure and carrying electrical components and a light emitting diode;
- said register enclosure including:
  - a shroud at least partially blocking the register circuit board from direct sunlight, said shroud comprising sidewalls closely positioned proximate sides of the meter frame;
  - a plurality of positioning ribs and positioning snaps engaging said register circuit board;
  - retaining means on said shroud securely engaging the register circuit board; wherein said positioning ribs and snaps and said retaining means securely position and engage said register circuit board; and
- a clamping snap mounting said register enclosure on a rear bearing of the electricity meter.

15. A register enclosure assembly in accordance with claim 14 wherein said shroud almost completely shield the electrical components of the register circuit board from ultraviolet exposure.

16. A register enclosure assembly in accordance with claim 14 wherein said register enclosure further comprises a shadowbox which aligns with the light emitting diode of the register circuit board.

17. A register enclosure assembly in accordance with claim 14 wherein said register enclosure further comprises a raised platform mounting a serial number label thereto, and gussets to support and stiffen said platform.

18. A register enclosure assembly in accordance with claim 14 wherein said register circuit board further includes a tongue and groove configuration and wherein said retaining means comprises ribs and a slot for cooperating with the tongue and groove configuration of the register circuit board.

19. A register enclosure assembly in accordance with claim 14 wherein said register enclosure is molded from a polycarbonate.

* * * * *